United States Patent [19]

Yanadori et al.

[11] Patent Number: 5,085,271
[45] Date of Patent: Feb. 4, 1992

[54] HEAT ACCUMULATION SYSTEM AND METHOD OF OPERATING THE SAME

[75] Inventors: Michio Yanadori, Ryugasaki; Toshihiko Fukushima, Tsuchiura; Yoshifumi Kunugi, Ibaraki, all of Japan

[73] Assignee: Hitachi, Ltd., Tokyo, Japan

[21] Appl. No.: 356,235

[22] Filed: May 24, 1989

[30] Foreign Application Priority Data

May 25, 1988 [JP] Japan .................. 63-125751

[51] Int. Cl.$^5$ .................. F28D 21/00; F25B 17/08
[52] U.S. Cl. .................. 165/104.12; 165/909; 62/478; 62/480
[58] Field of Search .................. 165/104.12, 909; 62/477, 478, 479, 480, 481, 482

[56] References Cited

U.S. PATENT DOCUMENTS 4,616,692 10/1986 Yasuda et al. .................. 62/480
4,881,376 11/1989 Yonezawa et al. .................. 62/480

FOREIGN PATENT DOCUMENTS

73013 4/1985 Japan .................. 165/104.12
34463 2/1988 Japan .
34464 2/1988 Japan .

*Primary Examiner*—Albert W. Davis, Jr.
*Attorney, Agent, or Firm*—Antonelli, Terry, Stout & Kraus

[57] ABSTRACT

A heat accumulation system has a plurality of chemical heat accumulation units arranged in parallel and each incorporating reaction vessels containing, respectively, a chemical heat accumulating material such as zeolite and a reaction medium such as water. Any surplus heat which could not be used in the regeneration of the chemical heat accumulation material in one system is utilized for evaporation of a reaction medium in the other unit. Disclosed also is a method of operating this system.

18 Claims, 4 Drawing Sheets

HEAT ACCUMULATION SYSTEM AND METHOD OF OPERATING THE SAME

BACKGROUND OF THE INVENTION

The present invention relates to a heat accumulation system making use of a chemical heat accumulation material and to a method of operating the same.

Heat accumulation apparatus employing chemical heat accumulation materials are disclosed in, for example, Japanese Unexamined Patent Publication Nos. 60-226678, 60-263060, 61-11574, 63-34463 and 63-34464.

In these known arts, however, no proposal has been made for an alternating use of a pair of parallel heat accumulation apparatus for the purpose of smooth operation of a system including the heat accumulation apparatus. In consequence, it has been impossible to make an efficient use of the heat energy possessed by a waste gas: namely, heat energy of the waste gas could not be used with high efficiency.

SUMMARY OF THE INVENTION

Accordingly, an object of the present invention is to provide a heat accumulation system which enables an efficient use of surplus heat produced during regeneration of a chemical heat accumulation material, as well as a method of operating the heat accumulation system.

Another object of the present invention is to provide a heat accumulation system which enables an efficient use of heat possessed by gases which are generated during regeneration of a chemical heat accumulation material, as well as a method of operating the heat accumulation system.

Still another object of the present invention is to provide a heat accumulation system and a method of operating the system, wherein a plurality of units of chemical heat accumulation apparatus are operated alternately to smooth the operation of the whole system.

According to one aspect of the present invention, there is provided a heat accumulation system comprising: at least two chemical heat accumulation units each including a first vessel accommodating a chemical reaction material, a second vessel accommodating a reaction medium, a pipe connected between the first and second vessels, and a valve provided at an intermediate portion of the pipe: first heat supplying means for introducing heat from a heat source into the first vessel of one of the chemical heat accumulation units so as to heat the chemical reaction material and further introducing the heat remaining after heating of the chemical reaction material into the second vessel of the other chemical heat accumulation unit so as to heat the reaction medium in the second vessel; second heat supplying means for introducing heat from the heat source into the first vessel of the other of the chemical heat accumulation units so as to heat the chemical reaction vessel and further introducing the heat remaining after heating of the chemical reaction material into the second vessel of the one of the chemical heat accumulation unit so as to heat the reaction medium in the second vessel; and heat recovery means for recovering, by means of a heat medium, heat generated as a result of heat-generating reaction of the reaction material in the first vessels of the chemical heat accumulation units.

According to another aspect of the invention, there is provided a method of operating a heat accumulation system comprising the steps of: preparing at least two chemical heat accumulation units each including a first vessel accommodating a chemical reaction material, a second vessel accommodating a reaction medium and gas introducing means for introducing a gas generated in one of the vessels into the other of the vessels: introducing heat from a heat source into the first vessel of one of the chemical heat accumulation units so as to heat the chemical reaction material and further introducing the heat remaining after heating of the chemical reaction material into the second vessel of the other chemical heat accumulation unit so as to heat the reaction medium in the second vessel thereby generating vapor of the reaction medium; introducing the vapor to the first vessel of the other chemical heat accumulation unit into reaction with the reaction material; and recovering the heat generated as a result of the reaction.

According to still another aspect of the present invention, there is provided a method of operating a heat accumulation system comprising the steps of: preparing at least two chemical heat accumulation units each including a first vessel accommodating a chemical reaction material, a second vessel accommodating a reaction medium, a pipe connected between the first and second vessels, and a valve provided at an intermediate portion of the pipe: introducing heat from a heat source into the first vessel of one of the chemical heat accumulation units so as to heat the chemical reaction material and further introducing the heat remaining after heating of the chemical reaction material into the second vessel of the other chemical heat accumulation unit so as to heat the reaction medium in the second vessel, thereby generating a gas of the reaction medium of an elevated pressure; introducing the gas into the first vessel of the other chemical heat accumulation unit so as to cause a heat-generating reaction of the reaction material in the first vessel, while introducing a gas generated by regeneration of the reaction material in the first vessel of the one of the chemical heat accumulation units into the second vessel of the one of the chemical heat accumulation units, thereby allowing heat possessed by the gas to be absorbed by a heat recovery medium; introducing the heat recovery medium into the first vessel of the other chemical heat accumulation unit in which the heat-generating reaction is taking place; and executing these steps alternately with each of the chemical heat accumulation units.

Thus, the heat accumulation system according to the present invention has at least two chemical heat accumulation units arranged in parallel and each including a first vessel containing a reaction material (chemical heat accumulating material) and a second vessel containing a reaction medium. When two such units are used, any surplus heat which could not be utilized in the regeneration of the reaction material in the first unit is efficiently utilized for the purpose of heating of the reaction medium in the second vessel in the second unit. The gas or vapor produced as a result of the regeneration of the reaction material in the first vessel of the first unit is condensed in the second vessel of the same unit by allowing another heat medium to absorb condensation heat, so that this heat medium is pre-heated. The pre-heated heat medium is brought into heat exchange with the reaction material in the first vessel of the second unit so as to be heated up to a higher temperature through absorption of the reaction heat, whereby heat can be recovered effectively and delivered as a heat output.

According to the invention, it is thus possible to make an efficient use of the surplus heat which could not be utilized for regeneration of the reaction material and the condensation heat generated when the gas produced as a result of the regeneration is liquefied. The described operation can be executed alternately with each of the first and second chemical heat accumulation units by switching the operation phases of these units, thereby offering a high rate of utilization of heat energy.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
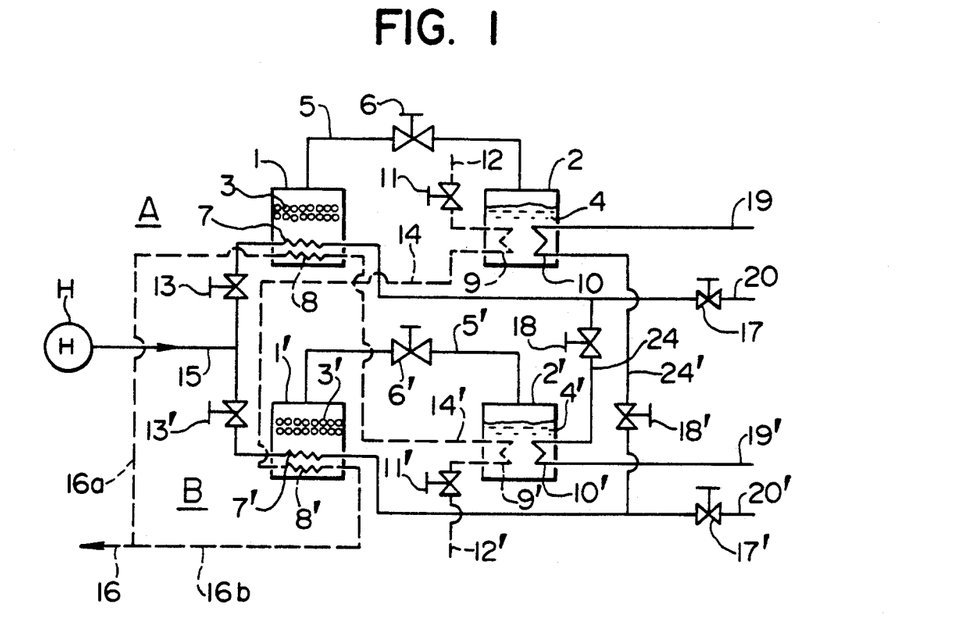
FIG. 1 is an illustration of an embodiment of the heat accumulation system in accordance with the present invention.

Referring to FIG. 1, an embodiment of the heat accumulation system of the present invention is composed mainly of a first chemical heat accumulation unit A and a second chemical heat accumulation unit B. The first chemical heat accumulation unit includes a first vessel 1 containing a reaction material 3 such as lime, zeolite or the like, a second vessel 2 containing a reaction medium such as water, methanol or the like, a pipe 5 connected between the first and second vessels 1 and 2, and a valve 6 provided at an intermediate portion of the pipe 5. Similarly, the second heat accumulation unit includes a first vessel 1' containing a reaction material 3', a second vessel 2' containing a reaction medium 4', a pipe 5' connected between the first and second vessels 1' and 2', and a valve 6' provided at an intermediate portion of the pipe 5'.

The heat accumulation system is connected to, for example, a heat source H which discharges waste heat in the form of a comparatively high temperature of a fluid. The heat source H is, for example, a gas turbine, an internal combustion engine, a fuel cell or the like. Heat produced by a blast furnace, solar heat and heat generated by utilization of midnight power also can be used as the heat from a heat source H. A description will be given of a practical example of application of this system in which the first and second heat accumulation systems are operated alternately to recover heat wasted from the heat source H so as to continuously generate heat in the form of a temperature higher than that wasted from the heat source, thereby enabling an efficient use of the wasted heat.

It is assumed here that the first chemical heat accumulation unit is in the heat accumulation phase (regeneration), while the second chemical heat accumulation system is in the heat discharging phase. A medium carrying heat wasted from the heat source H is delivered to a heat exchanger 7 provided in the reaction material 3 in the first vessel 1, through a duct or a pipe 15 via a valve 13. It is to be understood that a corresponding valve 13' associated with the second heat accumulation unit is closed in this mode. Consequently, the reaction material 3 is heated so that the reaction medium 4 adsorbed or absorbed on or in the reaction material 3 is evaporated to become a gas which is supplied to the second vessel 2 through the pipe 5. The gas is then cooled and liquefied while giving condensation heat to a heat medium which is introduced into the second vessel 2 through a pipe 12. It is assumed here that the reaction material 3 is lime (CaO) and has been changed into slaked lime (Ca(OH)$_2$) upon absorption of the reaction medium 4. In such a case, vapor of H$_2$O is separated in the first vessel 1 as a result of heating by the waste heat, so that the reaction material 3 is progressively changed again into CaO. On the other hand, the vapor of H$_2$O introduced into the second vessel 2 is effectively used in the following manner. The above-mentioned heat medium, which may be water or air, is introduced into a heat exchanger 9 in the second vessel 2 through the pipe 12 via a valve 11. Consequently, the vapor of H$_2$O introduced into the second vessel 2 is condensed as a result of delivery of heat to the heat medium, so that the heat medium is heated to a higher temperature. The thus heated heat medium is then introduced into a heat exchanger 8' in the first vessel 1' of the second chemical heat accumulation unit through a pipe 14. Since the second chemical heat accumulation unit is in the heat discharging phase, the reaction medium 4' in the second vessel 2' is evaporated to become vapor which is introduced through a pipe 5' into the first vessel 1' of the second heat accumulation unit, so that the vapor reacts with the reaction material 3'. The reaction material 3' has been heated to an extremely high temperature as a result of the reaction, so that the heat medium introduced into the heat exchanger 8' is heated to a very high temperature by the heat of the reaction material 3' so as to become superheated gas or superheated steam. The temperature to which the heat medium is heated is higher than the temperature of the medium carrying the heat wasted from the heat source H. The heat medium thus heated to a high temperature is then delivered through an outlet pipe 16 so that the heat possessed by the heat medium is effectively utilized. In this process, the heat required for gasifying the reaction medium 4' in the second vessel 2' of the second heat accumulation unit is derived from the gas wasted from the final stage of the heat source H. Namely, the waste heat carrying medium carrying the waste heat from the heat source H, introduced into the heat exchanger 7 for heating the reaction material 3, still possesses heat even after the heating of the reaction material 3. The waste heat carrying medium is then introduced through a valve 18 and a duct 24 into a heat exchanger 10' in the second vessel 2' so as to heat the reaction medium 4'. When a large quantity of heat is introduced into the heat exchanger 10', openings of the valve 18 and the opening of a valve 17 in a branching line are suitably controlled so as to allow any surplus heat to be delivered to the outside of the system through another outlet pipe 20 via the valve 17.

When the heat accumulation (regeneration) in the first chemical heat accumulation unit and the heat discharge from the second chemical heat accumulation unit are over, the operation phases are switched so that the first and the second chemical heat accumulation units become ready for operations in the heat discharging phase and in the heat accumulation phase, respectively. It is therefore possible to continuously operate the system without suspending recovery of the heat. It will be seen that the switching of two chemical heat accumulation units is possible by a suitable valve operation, because both units have the same arrangement. In some cases, it may become necessary that the heat accumulation (regeneration) or the heat discharging operation is temporarily suspended. In order to cope with such a demand, the operator is required only to close the valve 6 in the pipe 5 or the valve 6' in the pipe 5'.

As will be understood from the foregoing description, the heat accumulation system embodying the present invention employs a plurality of chemical heat accumulation units which are operated alternately or in a switching manner so that the whole system can smoothly operate without suspension. In addition, both the heat generated through regeneration of the reaction material and the heat which could not be utilized in the heating of the reaction material are effectively recovered and utilized. Consequently, the heat accumulation system of the present invention provides a high rate of recovery of waste heat energy well reaching 90% or higher, in contrast to conventional systems which could provide a waste heat recovery rate of about 70% or so at the highest.

Figure 2:
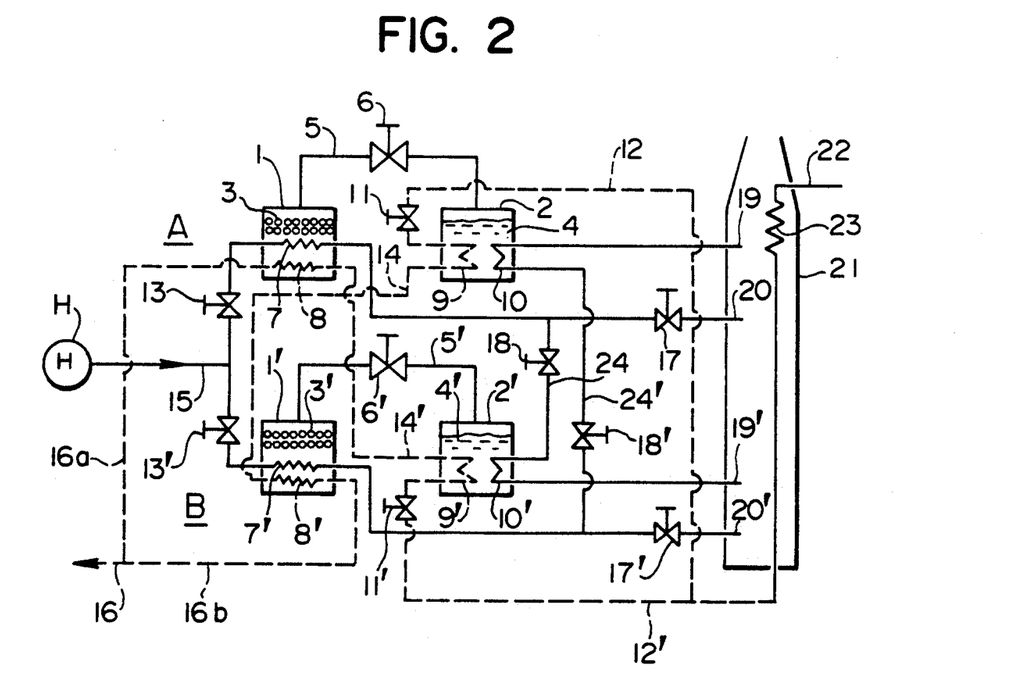
FIGS. 2 to 7 are illustrations of modifications of the heat accumulation system of the present invention.

In the modification of FIG. 2, the waste heat carrying medium from the heat source is introduced into the first vessel 1 or 1' and is then introduced into an exhaust duct 21 directly through the pipe 20 or 20' or via the second vessel 2' or 2 and the pipe 19' or 19 so that the heat energy still remaining in the waste heat carrying medium is effectively recovered in the exhaust duct 21. More specifically, a heat medium such as water is introduced into a heat exchanger 23 disposed in the exhaust duct 21 via an inlet pipe 22 so that the heat medium is heated by the heat remaining in the waste heat carrying medium. The thus heated heat medium is then introduced into the second vessel 2 through the pipe 12 and then into the first vessel 1' through the pipe 14 so as to become a vapor of high temperature which is delivered through the outlet pipe 16. Alternatively, the heat medium is introduced into the second vessel 2' through the pipe 12' and then into the first vessel 1 through the pipe 14' so as to become a vapor of high temperature which is delivered through the outlet pipe 16. It will be seen that the modification shown in FIG. 2 provides a higher rate of recovery of the waste heat.

Figure 3:
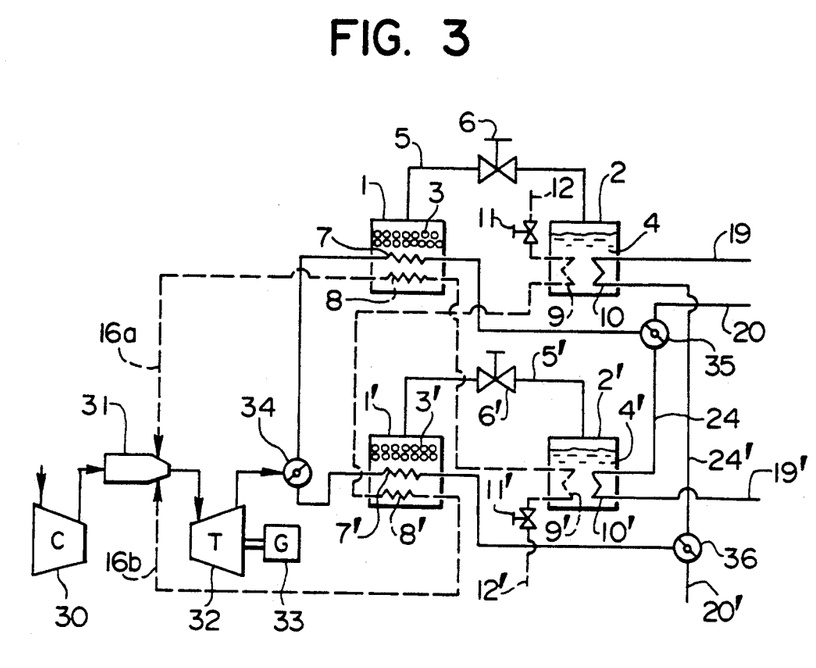

FIG. 3 shows another modification of the embodiment of FIG. 1 combined with a power generating gas turbine system. The gas turbine system has a compressor 30, a combustor 31, a gas turbine 32 and a generator 33 for generating electric power. In this case, water is used as the heat medium introduced through the pipe 12 or 12'. The heat medium is evaporated to become steam as it passes through the heat exchanger 8' or 8 and is injected into the combustor 31 through a pipe 16b or 16b for the purpose of suppressing generation of nitrogen oxides (NOx). In this modification, gas dampers or change-over valves 34 and 35 are used in place of the valves 13, 13', 17, 17' and 18, 18' of FIG. 1, thereby simplifying the construction of the system.

Figure 4:
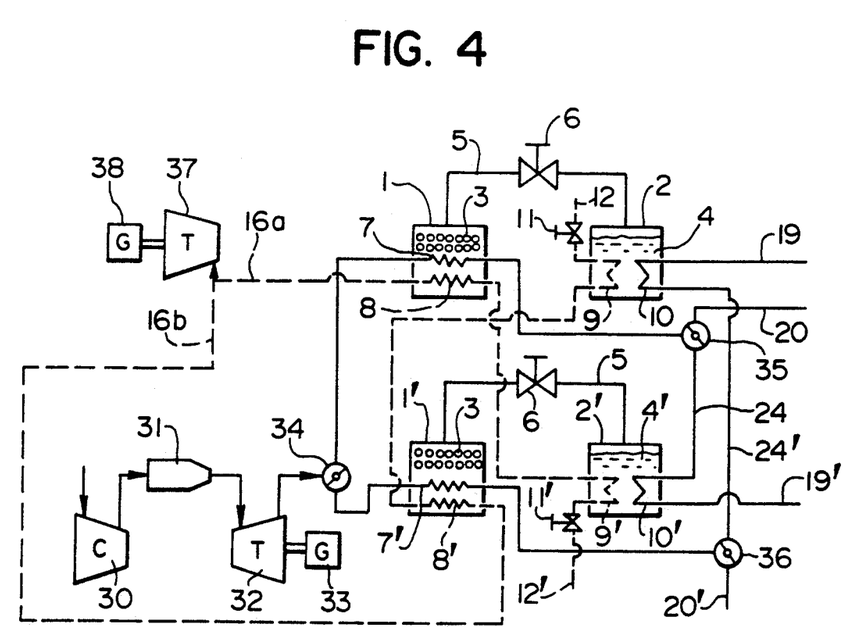

FIG. 4 shows a different modification in which the heat accumulation system is connected to a combined power generating system having a power generating gas turbine system and a power generating steam turbine system. This modification is different from that shown in FIG. 3 in that the steam of high temperature and pressure available at the outlet pipe 16a or 16b is introduced into a steam turbine 37 so as to drive a generator 38 thereby increasing the total electric output power of the combined power generating system.

It will be clear to those skilled in the art that the modifications of FIGS. 3 and 4 may be combined with each other such that the steam of high temperature and pressure available at the outlet pipes 16a and 16b is introduced into the combustor 31 and the steam turbine 37.

The invention also may be modified such that a pair of heat accumulation systems, each having a construction as shown in FIG. 1, are combined so as to provide a dual system. Such a dual system includes a pair of first chemical heat accumulation units A of the same type as that shown FIG. 1 arranged in parallel with each other and a pair of the second chemical heat accumulation units B of the same type as that shown in FIG. 1 arranged in parallel with each other. One or both of the units in the respective pairs of units are put into operation according to a change in the heat wasted from the heat source H. It is also possible to operate two pairs of heat accumulation units with a suitable time difference so as to smooth the heat output from the system. It is also possible to construct a multiple system by combining three or more heat accumulation systems each having the same construction as that shown in FIG. 1.

The arrangement also may be such that a parallel connection of a pair of second chemical heat accumulation units B of a comparatively small capacity is used in combination with a single first chemical heat accumulation unit A of a comparatively large capacity.

Figure 5:
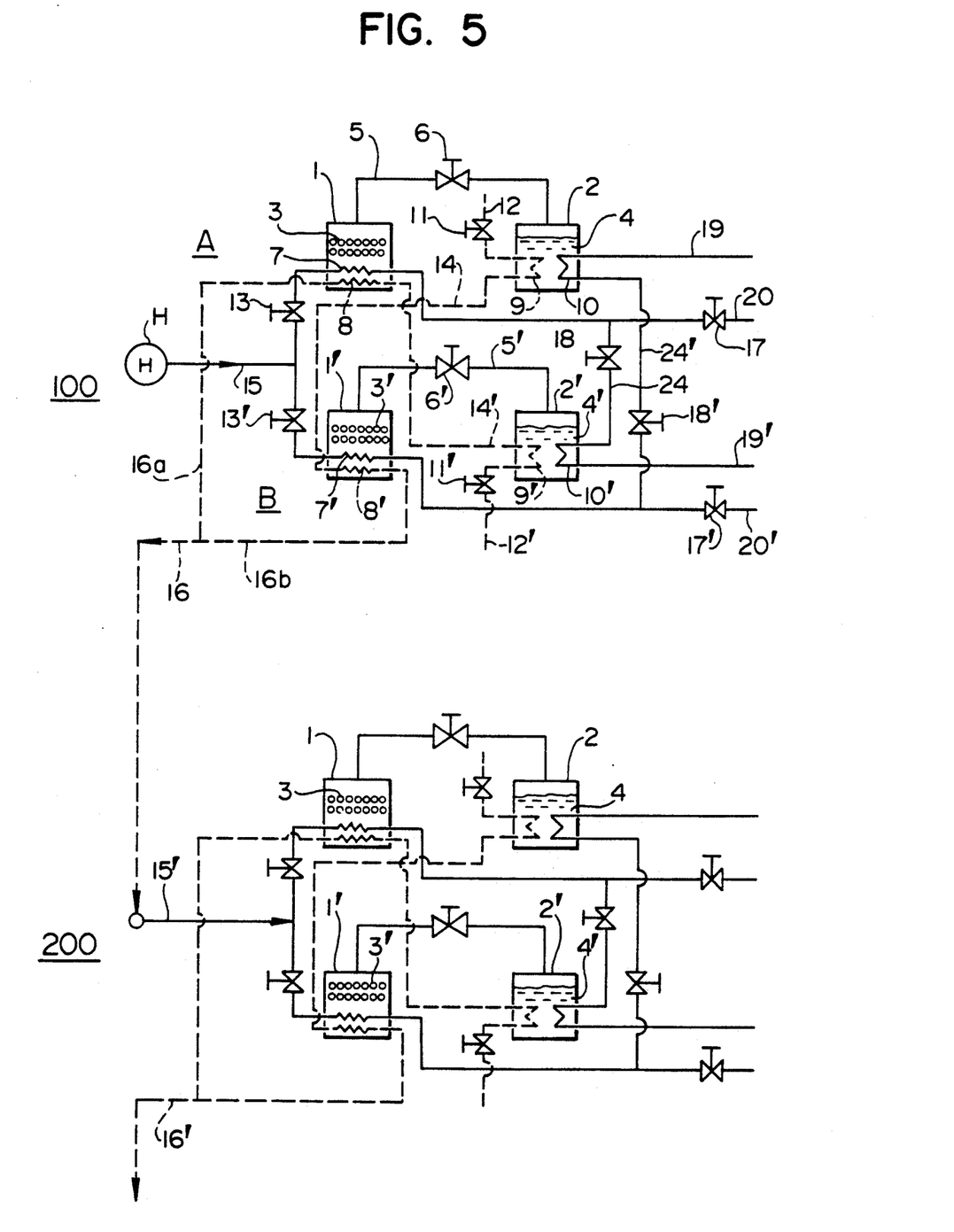

In this modification of FIG. 5, a plurality of heat accumulation systems, each having the same construction as the system shown in FIG. 1, is connected in series so as to provide a multi-staged heating system. Namely, the heat medium of high temperature delivered from the outlet pipe 16 of the heat accumulation system 100 of the first stage is introduced into the duct or pipe 15' of the heat accumulation system 200 of the second stage so that the temperature of the heat medium is further elevated. In this modification, a chemical heat accumulation material which exhibits a comparatively low heating temperature, e.g., zeolite, is used in the heat accumulation system 100 of the first stage, whereas, the heat accumulation system 200 of the second stage utilizes a chemical heat accumulation material which develops a heating temperature higher than that produced by the material of the first stage, e.g., lime or strontium oxide.

For instance, referring to FIG. 5, zeolite is used as the reaction material 3, 3' in the first vessels 1, 1' of the first stage and water is used as the reaction medium 4, 4' in the second vessels 2, 2'. In such a case, steam of about 350° C. is obtained from the outlet pipe of the first stage. This steam is supplied into the first vessels 1, 1' of the heat accumulation system 200 of the second stage through the pipe 15'. If lime (or strontium oxide) and water are used, respectively, as the reaction material 3,3' in the first vessels 1,1' and the reaction medium 4,4' in the second vessels 2,2' of the second stage heat accumulation system 200, a high steam temperature of 650° C. is obtained at the outlet pipe 16' of the second stage heat accumulation system 200.

Figure 6:
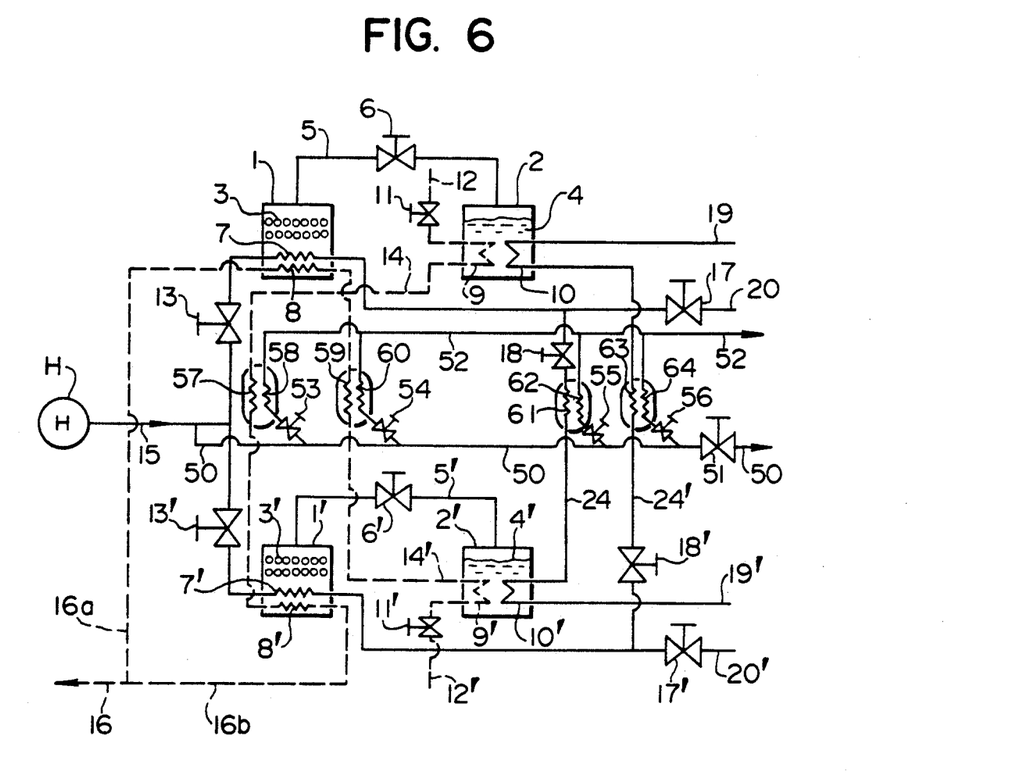

FIG. 6 shows a different modification of the heat accumulation system of FIG. 1, arranged to further improve the performance. In this embodiment, a duct (or pipe) 50 shunts from the duct (or pipe) 15. Heat media flowing through the pipe 14 and 14' are heated by the heat carried by a fluid flowing through the ducts (and pipes) 50, through heat exchange performed in heat exchangers 57 to 60. At the same time, the waste heat carrying medium flowing through the duct (or pipe) 24 or 24' are heated through heat exchangers 61 to 64 thereby attaining a higher overall heat recovery efficiency. As will be seen from FIG. 6, the medium flowing through the duct (or pipe) 50 is discharged into an exhaust duct 52 through valves 53 to 56, and heat exchangers 58, 60, 62 and 64. On the other hand, the heat exchangers 57 and 59 are provided in the pipes 14 and 14'. The heat media flowing through these heat exchangers are heated by a heat exchange through heat exchangers 58 and 60 and are then further heated upon absorption of reaction heat through the heat exchanger 8' or 8. The heat exchangers 61 and 63 are provided in the ducts 24 and 24', respectively. The waste heat carrying medium flowing through these heat exchangers 61 and 63 is heated through the above-mentioned heat exchangers 62 and 64 and are introduced into the heat exchangers 10', 10 so as to heat the reaction medium 4', 4. The degree of heating of the heat medium flowing through the heat exchangers 57 and 59 and the degree of heating of the waste heat carrying medium flowing through the heat exchangers 61 and 63 can be controlled by suitably adjusting the openings of the valves 53, 54, 55, 56 and 51.

Figure 7:
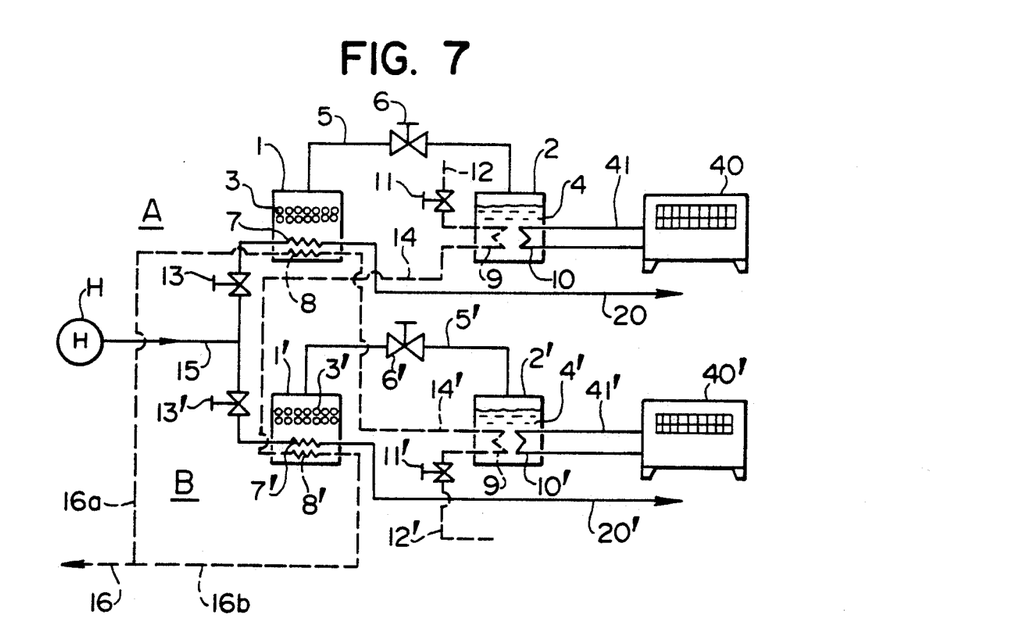

FIG. 7 shows a different modification in which the heat accumulation system shown in FIG. 1 is applied to a refrigeration system or an air conditioning system. Referring to FIG. 7, heat exchangers 10,10' are connected to fan-coil units (or coolers) 40, 40' through pipes 41, 41'. The pipes 19, 19' shunting from the outlet pipes 20, 20' in the embodiment shown in FIG. 1 are omitted in this modification. It is assumed that the first chemical heat accumulation system A, composed of first and second vessels 1, 2, pipe 5 and valve 6, is in the regenerating phase for regeneration of the heat accumulation material by the waste heat derived from the heat source H, while the second chemical heat accumulation system B, composed of first and second vessels 1', 2', pipe 5' and valve 6', is in the heat discharging phase. When a heat medium introduced through the heat exchangers 9 and 8', it cools a reaction medium 4, e.g., alcohol or freon, and a reaction material 3', e.g., silica-gel or zeolite, so that regeneration is promoted in the first chemical heat accumulation system A. In the second chemical heat accumulation system B, the reaction material such as silica-gel absorbs a gas, e.g., alcohol gas, coming from the second vessel 2', so that the discharge of the heat is promoted. On the other hand, the temperature of the reaction medium 4', e.g., alcohol, in the second vessel 2' is lowered as a result of evaporation thereof. Meanwhile, a refrigerant, e.g., water or freon is circulated in the pipe 41' by means of a pump (not shown) so as to convey cold heat from the reaction medium 4' to the fan-coil unit (or cooler) 40' across the heat exchanger 10', thereby to chill air or to freeze goods. When the first and second chemical heat accumulation units A and B are switched to heat discharging phase and regeneration phase, respectively, the cold heat becomes available at the heat exchanger 10, so that the fan-coil unit 10 is put into operation for the purpose of chilling air or freezing goods.

It is possible to connect the pipes 41 and 41' through a change-over valve. In such a case, one of the fan-coil units (or coolers) 40 and 40' can be omitted. On the other hand, heat medium coming from the outlet pipe 16 has been heated to a high temperature so that it can be used for the purpose of heating water to enable a hot water service.

It will be clear to those skilled in the art that a multistage system can be obtained by arranging a plurality of systems of the type shown in FIG. 7 in a multiple stages as in the case of the modification described in connection with FIG. 5, so that a cold heat of a further lowered temperature can be generated.

As will be understood from the foregoing description, the heat accumulation system of the present invention provides a high heat recovery efficiency when used in an air conditioning or a refrigeration system, as in the cases of other applications. Practically, a cold heat of about −30° C. or so can be obtained in the second vessel, by using an alcohol such as methyl alcohol or ethyl alcohol as the reaction medium and silica-gel as the reaction material.

The heat accumulation system of the present invention employs a parallel connection of a plurality of chemical heat accumulation units such that the waste heat remaining in the waste heat carrying medium after regeneration of the reaction material in one of the units is utilized in the evaporation of the reaction medium in the other chemical heat accumulation unit, so that the heat derived from a heat source can be recovered with a high efficiency.

The heat accumulation system of the present invention has heat recovery means in which a heat medium used for the purpose of heat recovery is circulated through the second vessel of one of the heat accumulation units so as to absorb condensation heat which is generated in this second vessel as a result of condensation of the gas which has been produced as a result of regeneration of the reaction material, the heat medium being then introduced into the first vessel of the other chemical heat accumulation unit which is in the heat radiating phase. It is therefore possible to further heat the heat medium to a higher temperature, thus offering a higher efficiency of heat recovery.

It is also to be noted that the heat accumulation system of the present invention can operate smoothly and continuously because a plurality of chemical heat accumulation units can alternately put into heat radiating operation and regenerating operation such that one of the units discharges heat while the other or another unit regenerates the reaction material.

What is claimed is:
1. A heat accumulation system comprising:
   a least two chemical heat accumulation units each including a first vessel accommodating a chemical reaction material, a second vessel accommodating a reaction medium, a pipe providing a fluid-flow communication between said first and second vessels, and a valve provided in said pipe;
   first heat supplying means for introducing heat from a heat source into said first vessel of one of said chemical heat accumulation units so as to heat said chemical reaction material to thereby generate a gas in said first vessel and further introducing the heat remaining after the heating of said chemical reaction material into said second vessel of the other chemical heat accumulation unit so as to heat said reaction medium in said second vessel to thereby generate another gas in said second vessel;
   second heat supplying means for introducing heat from said heat source into said first vessel of the other of said chemical heat accumulation units so as to heat said chemical reaction material to thereby generate a gas in said first vessel and further introducing the heat remaining after heating of said chemical reaction material into said second vessel of said one of said chemical heat accumulation units so as to heat said reaction medium in said second vessel to thereby generate another gas in said second vessel, with said gases respectively flowing through pipes;

heat recovery means for causing a heat medium to flow through said second vessel of one of said chemical heat accumulation units in a heat exchanging relationship with said reaction medium therein and then through said first vessel of the other chemical heat accumulation unit in a heat exchanging relationship with said chemical reaction material therein to thereby recover heat generated as a result of a heat-generating reaction of said chemical reaction material in said first vessel of said heat accumulation unit, wherein said first and second heat supplying means respectively comprise first and second pipe lines for conveying a medium heated by said heat source, said first pipe line extending through the first vessel of said one chemical heat accumulation unit in a heat exchanger relationship with the chemical reaction material therein and then through the second vessel of said other chemical heat accumulation unit in a heat exchange relationship with the reaction medium therein, said second pipe line extending through the first vessel of said other chemical heat accumulation unit in a heat exchange relationship with the chemical reaction material therein and then through the second vessel of said one chemical heat accumulation unit in a heat exchange relationship with the reaction material therein, and wherein valve means are provided for alternately closing said first and second pipe lines so that operation phases of said chemical heat accumulation units are alternately switched.

2. A heat accumulation system according to claim 1, further comprising an exhaust duct for recovering waste heat derived from said first and second heat supplying means, said heat recovering means being capable of introducing said heat medium into said exhaust duct so as to heat said heat medium and introducing the heated heat medium into said first vessel in which said heat-generating reaction is taking place.

3. A heat accumulation system according to claim 1, wherein said heat from said heat source is heat wasted from a gas turbine, while said heat medium used in said heat recovery system is water, said water being heated as a result of the heat recovery to become steam which is introduced into a combustor of said gas turbine.

4. A heat accumulation system according to claim 1, wherein said heat medium used in said heat recovery means is water, said water being heated as a result of the heat recovery to become steam which is introduced into a steam turbine to drive said steam turbine.

5. A heat accumulation system according to claim 1, wherein said heat recovery means comprises third and fourth pipe lines for conveying said heat medium, said third pipe line extending through the second vessel of said one chemical heat accumulation unit in a heat exchanging relationship with the reaction medium therein and then through the first vessel of said other chemical heat accumulation unit in a heat exchanging relationship with the chemical reaction material therein, said fourth pipe line extending through the second vessel of said other chemical heat accumulation unit in a heat exchange relationship with the reaction medium therein and then through the first vessel of said one chemical heat accumulation unit in a heat exchanging relationship with the chemical reaction material therein.

6. A heat accumulation system comprising:

a least two chemical heat accumulation units each including a first vessel accommodating a chemical reaction material, a second vessel accommodating a reaction medium, and gas introducing means for introducing a gas generated in one of said vessels into the other of said vessels;

heat supplying means provided for said chemical heat accumulation units and capable of introducing heat from a heat source into said first vessel of one of said chemical heat accumulation units so as to heat said chemical reaction material to thereby generate gas in said first vessel and further introducing the heat remaining after heating of said chemical reaction material into said second vessel of the other chemical heat accumulation unit so as to heat said reaction medium in said second vessel to thereby generate gas in said second vessel, said gases flowing through said gas introducing means;

heat recovery means for causing a heat medium to flow through said second vessel of one of said chemical heat accumulation units in heat exchanging relationship with said reaction medium therein and then through said first vessel of the other chemical heat accumulation unit in heat exchanging relationship with said chemical reaction material therein to thereby recover heat generated as a result of a heat-generating reaction of said reaction material in said first vessel of said chemical heat accumulation unit;

wherein said heat supplying means comprises first and second pipe lines for conveying a medium heated by said heat source, said first pipe line extending through the first vessel of said one chemical heat accumulation unit in a heat exchange relationship with the chemical reaction material therein and then through the second vessel of said other chemical heat accumulation unit in a heat exchange relationship with the reaction medium therein said second pipe line extending through the first vessel of said other heat accumulation unit in a heat exchange relationship with the chemical reaction material therein and then through the second vessel of said one chemical heat accumulation unit in a heat exchange relationship with the reaction material therein; and wherein valve means are provided for alternately closing said first and second pipe lines so that operation phases of said chemical heat accumulation units are alternately switched.

7. A heat accumulation system according to claim 6, further comprising an exhaust duct for recovering waste heat derived from said first and second heat supplying means, said heat recovering means being capable of introducing said heat medium into said exhaust duct so as to heat said heat medium and introducing the heated heat medium into said first vessel in which said heat-generating reaction is taking place.

8. A heat accumulation system according to claim 6, wherein said heat from said heat source is heat wasted from a gas turbine, while said heat medium used in said heat recovery system is water, said water being heated as a result of the heat recovery to become steam which is introduced into a combustor of said gas turbine.

9. A heat accumulation system according to claim 6, wherein said heat medium used in said heat recovery means is water, said water being heated as a result of the heat recovery to become steam which is introduced into a steam turbine to drive said steam turbine.

10. A heat accumulation system according to claim 5, wherein said heat recovery means comprises third and fourth pipe lines for conveying said heat medium, said third pipe line extending through the second vessel of said one chemical heat accumulation unit in a heat exchanging relationship with the chemical reaction medium therein and then through the first vessel of said other chemical heat accumulation unit in a heat exchanging relationship with the chemical reaction material therein, said fourth pipe line extending throught the second vessel of said other chemical heat accumulation unit in a heat exchanging relationship with the chemical reaction medium therein and then through the first vessel of said one chemical heat accumulation unit in a heat exchanging relationship with the chemical reaction material therein.

11. A heat accumulation system comprising:
a least two chemical heat accumulation units each including a first vessel accommodating a reaction material and a second vessel accommodating a reaction medium;
heat supplying means for introducing heat derived from a heat source into said first vessel of each of said chemical heat accumulation units to heat said chemical reaction material therein to thereby generate a gas in said first vessel;
means for conveying said gas from said first vessel of each chemical heat accumulation unit to the second vessel of the unit;
heat recovery means for introducing a heat recovery medium into said second vessel of one of said chemical heat accumulation units in a heat exchanging relationship with said reaction medium in said second vessel and then into said first vessel of the other chemical heat accumulation unit in a heat exchanging relationship with said chemical reaction material in said first vessel thereby recovering heat generated as a result of a heat-generating reaction of said chemical reaction material in said first vessel;
wherein said heat supplying means comprises first and second pipe lines for conveying a medium heated by said heat source, said first pipe line extending through the first vessel of said one chemical heat accumulation unit in a heat exchanging relationship with the chemical reaction material therein, said second pipe line extending through the first vessel of said other chemical heat accumulation unit in a heat exchange relationship with the chemical reaction material therein; and
wherein valve means are provided for alternately closing said first and second pipe lines so that operation phases of said chemical heat accumulation units are alternately switched.

12. A heat accumulation system according to claim 11, further comprising an exhaust duct for recovering waste heat derived from said first and second heat supplying means, said heat recovering means being capable of introducing said heat medium into said exhaust duct so as to heat said heat medium and introducing the heated heat medium into said first vessel in which said heat-generating reaction is taking place.

13. A heat accumulation system according to claim 11, wherein said heat from said heat source is heat wasted from a gas turbine, while said heat medium used in said heat recovery system is water, said water being heated as a result of the heat recovery to become steam which is introduced into a combustor of said gas turbine.

14. A heat accumulation system according to claim 11, wherein said heat medium used in said heat recovery means is water, said water being heated as a result of the heat recovery to become steam which is introduced into a steam turbine to drive said steam turbine.

15. A heat accumulation system according to claim 9, wherein said heat recovery means comprises third and fourth pipe lines for conveying said heat medium, said third pipe line extending through the second vessel of said one chemical heat accumulation unit in a heat exchanging relationship with the chemical reaction medium therein and then through the first vessel of said other chemical heat accumulation unit in a heat exchanging relationship with the chemical reaction material therein, said fourth pipe line extending through the second vessel of said other chemical heat accumulation unit in a heat exchanging relationship with the chemical reaction medium therein and then through the first vessel of said one chemical heat accumulation unit in a heat exchanging relationship with the chemical reaction material therein.

16. A method of operating a heat accumulation system, the method comprising the steps of:
preparing at least two chemical heat accumulation units each including a first vessel accommodating a chemical reaction material, a second vessel accommodating a reaction medium and gas introducing means for introducing a gas generated in one of said vessels into the other of said vessels;
introducing heat from a heat source into said first vessel of one of said chemical heat accumulation units so as to heat said chemical reaction material therein and further introducing the heat remaining after heating of said chemical reaction material into said second vessel of the other chemical heat accumulation unit so as to heat said reaction medium in said second vessel thereby generating vapor of said reaction medium;
introducing said vapor through said gas introducing means into said first vessel of said other chemical heat accumulation unit to cause a reaction of said vapor with said chemical reaction material;
causing a heat medium to flow through said second vessel of the other chemical heat accumulation unit in a heat exchanging relationship with said reaction medium therein and then through said first vessel of said one chemical heat accumulation unit in a heat exchanging relationship with said chemical reaction material therein to recover the heat generated as a result of said reaction;
thereafter introducing the heat from the heat source into said first vessel of the other chemical heat accumulation unit so as to heat said chemical reaction material therein and further introducing the heat remaining after heating of said chemical reaction material into said second vessel of said one chemical heat accumulation unit so as to heat said reaction medium therein thereby generating vapor of said reaction medium;
introducing the last-mentioned vapor through said gas introducing means into said first vessel of said one chemical heat accumulation unit to cause another reaction of said last-mentioned vapor with said reaction material therein; and causing another heat medium to flow through said second vessel of said one chemical heat accumulation unit in a heat exchanging relationship with said reaction medium therein and then through said first vessel of said other chemical heat accumulation unit in a heat exchanging relationship with said chemical reaction material therein to recover the heat generated as a result of the other reaction.

17. A method of operating a heat accumulation system, the method comprising the steps of:

preparing at least two chemical heat accumulation units each including a first vessel accommodating a chemical reaction material therein, a second vessel accommodating a reaction medium, a pipe providing a fluid-flow communication between said first and second vessels, and a valve provided in said pipe;

introducing heat from a heat source into said first vessel of one of said chemical heat accumulation units so as to heat said chemical reaction material and further introducing the heat remaining after heating of said chemical reaction material into said second vessel of the other chemical heat accumulation unit so as to heat said reaction medium in said second vessel, thereby generating a gas of said reaction medium at an elevated pressure;

introducing said gas through said pipe into said first vessel of said other chemical heat accumulation unit so as to cause a heat-generating reaction of said chemical reaction material in said first vessel, while introducing a second gas generated by regeneration of said chemical reaction material in said first vessel of said one chemical heat accumulation unit into said second vessel of said one chemical heat accumulation unit;

causing a heat recovery medium to flow through said second vessel of said one chemical heat accumulation unit in a heat exchanging relationship with said second gas thereby allowing heat possessed by said second gas to be absorbed by said heat recovery medium;

thereafter, introducing said heat recovering medium into said first vessel of said other chemical heat accumulation unit in which the heat-generating reaction is taking place to thereby recover the thus-generated heat; and executing the steps alternately with each of said chemical heat accumulation units.

18. A method of operating a heat accumulation system, the method comprising the steps of:

preparing first and second chemical heat accumulation units each including a first vessel accommodating a reaction material, a second vessel accommodating a reaction medium, and a pipe interconnecting said first and second vessels;

introducing regenerating heat from a heat source into said first vessel of said first chemical accumulation unit in a heat exchanging relationship with said reaction material therein so as to generate a gas in said first vessel;

introducing a heat medium into said second vessel of said first chemical accumulation unit;

introducing said gas through said pipe into said second vessel of said first chemical heat accumulation unit so as to allow heat possessed by said gas to be absorbed by said heat medium introduced into said second vessel;

causing said heat medium to flow from said second vessel of said first heat accumulation unit into said first vessel of said second chemical heat accumulation unit thereby allowing said heat medium to absorb heat generated by said reaction material in said first vessel of said second chemical heat accumulation unit;

causing a remaining portion of said regenerating heat to flow from said first vessel of said first chemical heat accumulation unit into said second vessel of said second chemical heat accumulation unit so as to generate another gas in said second vessel;

introducing said other gas into said first vessel of said second chemical heat accumulation unit; and executing the steps alternately with each of said first and second chemical heat accumulation units.

* * * * *